United States Patent
Enevoldsen et al.

(10) Patent No.: US 10,330,076 B2
(45) Date of Patent: Jun. 25, 2019

(54) BOLTED JOINT FOR ROTOR BLADE SEGMENTS

(71) Applicant: SIEMENS AKTIENGESELLSCHAFT, München (DE)

(72) Inventors: Peder Bay Enevoldsen, Vejle (DK); Steffen Frydendal Poulsen, Vejle (DK)

(73) Assignee: Siemens Gamesa Renewable Energy A/S (DK)

(*) Notice: Subject to any disclaimer, the term of this patent is extended or adjusted under 35 U.S.C. 154(b) by 173 days.

(21) Appl. No.: 15/420,396

(22) Filed: Jan. 31, 2017

(65) Prior Publication Data
US 2017/0268481 A1    Sep. 21, 2017

(30) Foreign Application Priority Data
Mar. 15, 2016    (EP) .................................... 16160341

(51) Int. Cl.
*F03D 1/06* (2006.01)
*F03D 13/10* (2016.01)

(52) U.S. Cl.
CPC .......... *F03D 1/0675* (2013.01); *F03D 13/10* (2016.05); *F05B 2240/221* (2013.01);
(Continued)

(58) Field of Classification Search
CPC .. F03D 1/0675; F03D 13/10; F05B 2260/301; F05B 2260/302; Y02E 10/721
See application file for complete search history.

(56) References Cited

U.S. PATENT DOCUMENTS

| | | | | |
|---|---|---|---|---|
| 3,890,758 A | * | 6/1975 | Bouchard | E04B 1/4128 248/650 |
| 4,861,207 A | * | 8/1989 | Do | F16B 37/047 411/104 |

(Continued)

FOREIGN PATENT DOCUMENTS

| | | |
|---|---|---|
| CN | 101737250 A | 6/2010 |
| CN | 201593478 U | 9/2010 |

(Continued)

OTHER PUBLICATIONS

Extended European Search Report dated Aug. 29, 2016; Application No. 16160341.0; 8 pgs.

(Continued)

*Primary Examiner* — David E Sosnowski
*Assistant Examiner* — Maranatha Boardman
(74) *Attorney, Agent, or Firm* — Schmeiser, Olsen & Watts LLP.

(57) ABSTRACT

A rotor blade of a wind turbine, wherein the rotor blade includes a first rotor blade segment and a second rotor blade segment is provided. The first rotor blade segment is connected with the second rotor blade segment by at least one bolted joint. The bolted joint includes a first attachment unit, which is attached to the first rotor blade segment, and a second attachment unit, which is attached to the second rotor blade segment. Finally, the bolted joint includes a threaded fastener which connects the first attachment unit with the second attachment unit. Furthermore, the invention is also related to a wind turbine including at least one such rotor blade.

13 Claims, 5 Drawing Sheets

(52) U.S. Cl.
CPC ... *F05B 2240/302* (2013.01); *F05B 2260/301* (2013.01); *Y02E 10/721* (2013.01)

(56) References Cited

U.S. PATENT DOCUMENTS

| | | |
|---|---|---|
| 2010/0122442 A1 | 5/2010 | Kirkpatrick |
| 2012/0045339 A1 | 2/2012 | Fleming |
| 2014/0334934 A1 | 11/2014 | Kannenberg et al. |
| 2015/0292477 A1 | 10/2015 | Kratmann et al. |

FOREIGN PATENT DOCUMENTS

| | | |
|---|---|---|
| CN | 202073726 U | 12/2011 |
| CN | 102562486 A | 7/2012 |
| CN | 102606419 A | 7/2012 |
| CN | 203670111 U | 6/2014 |
| CN | 103987959 A | 8/2014 |
| DE | 102014206670 A1 | 10/2015 |
| EP | 2746572 A2 | 6/2014 |
| EP | 2952739 A1 | 12/2015 |
| FR | 2948154 A1 | 1/2011 |
| WO | WO2006056584 A1 | 6/2006 |
| WO | WO2007131937 A1 | 11/2007 |
| WO | WO2013083451 A1 | 6/2013 |

OTHER PUBLICATIONS

Non-English Chinese Office Action dated Sep. 7, 2018 for Application No. 201710153570.8.
Non-English Chinese Office Action dated Apr. 1, 2019 for Application No. 201710153570.8.

* cited by examiner

BOLTED JOINT FOR ROTOR BLADE SEGMENTS

CROSS-REFERENCE TO RELATED APPLICATIONS

This application claims priority European Application No. 16160341.0 having a filing date of Mar. 15, 2016, the entire contents of which are hereby incorporated by reference.

FIELD OF TECHNOLOGY

The following relates to a rotor blade of a wind turbine comprising a first rotor blade segment and a second rotor blade segment, wherein the two segments are connected with each other by at least one bolted joint. Furthermore, the following relates to a wind turbine comprising at least one such rotor blade.

BACKGROUND

With ever increasing size of wind turbine blades, manufacturing, transportation and installation of wind turbine blades become more and more challenging. Therefore, intensive research and development activities regarding segmented rotor blades of a wind turbine are present. A segmented rotor blade is characterized in that it comprises at least two rotor blade segments which are connected with each other by a joint prior to operation of the wind turbine.

One example of such a segmented rotor blade is given in the international patent application WO 2006/056584 A1. Therein, a segmented rotor blade with a connection piece for connecting the two rotor blade segments is disclosed. Both rotor blade segments are connected with the connecting piece by bolted joints.

Another example of a segmented rotor blade is given in the international patent application WO 2007/131937 A1. Therein, both rotor blade segments are connected directly with each other, again via a plurality of bolted joints.

A third example of a segmented rotor blade is given in the international patent application WO 2013/083451 A1. Here again, two rotor blade segments are connected directly with each other by means of a plurality of bolted joints.

SUMMARY

It is furthermore mentioned that there also exists the approach of adhesively connecting the two rotor blade segments. In other words, bolted connections are substituted by adhesive connections in this approach.

There are several drawbacks of adhesive joints between two rotor blade segments which, however, shall not be discussed in this patent application.

There also exist some drawbacks of bolted joints in the state of the art. One important drawback is the need of thickening the blade shell in the area around the bolted joint. This implies thickening the laminate material of the blade shell in order to accommodate at least a part of the bolts. Furthermore, in the case of T-bolts, the laminate needs to be opened which implies a weakening of the laminate at these areas. As a consequence, T-bolt solutions for connecting two segments of a rotor blade of a wind turbine imply further thickening of the blade shell over a considerable extension. This is costly and increases the weight of the rotor blade.

Therefore, it would be desirable to have a concept how to provide a bolted joint which connects two rotor blade segments with each other and which overcomes the mentioned drawbacks of existing bolted joints.

According to embodiments of the invention, there is provided a rotor blade of a wind turbine comprising a first rotor blade segment and a second rotor blade segment. The first rotor blade segment is connected with the second rotor blade segment by at least one bolted joint. The bolted joint comprises a first attachment unit, which is attached to the first rotor blade segment, and a second attachment unit, which is attached to the second rotor blade segment. The bolted joint comprises a threaded fastener which connects the first attachment unit with the second attachment unit.

A key aspect of embodiments of the present invention is therefore that the rotor blade is composed of at least four separate pieces: the first rotor blade segment, the first attachment unit, the second rotor blade segment and the second attachment unit. The attachment units are attached to and connected with the rotor blade segments. However, a rotor blade segment and its associated attachment unit are not manufactured as one single piece, but in separate pieces. In distinction to known art concepts of segmented rotor blades with bolted joints, the rotor blade segments can be manufactured and configured without significant difference compared to a standard rotor blade which is made of one single piece. This means that the blade shell does not need to be thickened in the area adjacent to the joint of the rotor blade segments. This has the advantage that the specific effort of thickening the laminate and the additional weight of the rotor blade in the region adjacent to the joint is not necessary anymore. Therefore, the manufacturing process is simplified and cost and weight of the rotor blade is reduced.

Another advantage of the way of joining the two rotor blade segments together as disclosed in this patent application is that the size of the bolts is decoupled from the thickness of the laminate of the rotor blade shell: in known art concepts, wherein the bolts are at least partly submerged into the laminate of the rotor blade shells, the diameter of the bolts is limited by the thickness of the laminate. As, in the inventive concept, the bolts are submerged in the attachment units instead of the laminate, the maximum possible diameter of the bolts depends on the size of the attachment units instead of the laminate. Consequently, bigger bolts can be used relatively easily by only increasing the size of the attachment units and keeping the laminate of the rotor blade shell unchanged.

In a first alternative, the attachment units are attached to the respective rotor blade segments after manufacturing of the rotor blade segments is finished. Such an attachment may be realized by an adhesive bond.

In a second alternative, the attachment units are placed into the mold, wherein the blade shells are molded, together with the blade shell. In other words, the attachment units are cast to the rotor blade shells during the same casting process in which the rotor blade shells are casted. This means that the attachment unit is connected with the rotor blade segment during manufacturing, in particular before finishing the rotor blade. This has the advantage that a particularly strong and reliable connection between the attachment units and the rotor blade segments can be ensured.

The attachment units can be made of laminate material, e.g. similar to the material which constitutes the shell of the rotor blade segments.

Alternatively, the attachment units may be made by a different material compared to the shell of the rotor blade segments. As an example, the material of the shells may be composed by a laminate, and the attachment units may be made of metal.

Advantageously, the first rotor blade segment is connected with the second rotor blade segment by a plurality of bolted joints. The concrete number of bolted joints depends on the size and the expected loads of the rotor blade. For a 100-meter-long rotor blade of a wind turbine, a number of at least 50 bolted joints is a reasonable assumption.

It has to be noted that the rotor blade is composed of at least two rotor blade segments. This means that it can comprise two rotor blade segments but also three or even more rotor blade segments. Exemplarily, the first rotor blade segment comprises the radially inward portion of the rotor blade, and the second rotor blade segment comprises the radially outward portion of the rotor blade. In the case that the rotor blade consists of two rotor blade segments, the first rotor blade segment comprises the root of the rotor blade and the second rotor blade segment comprises the tip of the rotor blade.

Advantageously, the bolted joint is located in a spanwise position between 15% and 50% of the total blade length. In particular, the bolted joint is located at a spanwise position between 20% and 30% of the total length of the blade. This means that segmentation of the rotor blade is advantageously made in the inner half of the rotor blade.

In an embodiment of the invention, at least the first attachment unit comprises a through-hole for receiving and supporting the fastener.

In another embodiment, the threaded fastener is tightened by a nut, and the nut is in contact with the first attachment unit. Furthermore, the nut has at least partially a curved outer surface, and the first attachment unit has at least partially a curved outer surface as well. Finally, the outer surface of the nut and the outer surface of the first attachment unit correspond to each other.

The threaded fastener of the bolted joint which connects the two rotor blade segments with each other, can be screwed in another object with a corresponding thread. This other object may be attached using the nut.

In an embodiment of the invention, the nut is designed such that it fits in a form-fitted manner with the attachment unit, wherein the form-fitted manner is realized by mating curvatures of the respective corresponding outer surfaces of the nut and the attachment unit, respectively.

In particular, the nuts may have, at least in this part which is in contact with the first attachment unit, a shape which allows movement of the fastener in two dimensions during alignment and connection of the first rotor blade segment and the second rotor blade segment.

This movement in two dimensions has the advantage that during manufacturing and attachment of the attachment units to the rotor blade segments a certain tolerance is allowable. Specifically in the case of a relatively large number of joints between the two rotor blade segments, very strict requirements regarding the precision of attaching the attachment units to the rotor blade segments would be difficult and costly to realize. By providing a certain freedom and allowable movement of the fastener this is of great advantage when realizing this concept of connecting two rotor blade segments together into practice.

As an example, the nut may be designed as a circular cylinder with a longitudinal axis which is substantially perpendicular to the longitudinal axis of the rotor blade. Such a shape of a nut is also referred to as a cross-dowel. Consequently, the attachment unit has, at least in the region which is destined to be in contact with the nut, an outer surface which corresponds to this cross-dowel nut.

In another advantageous embodiment, the nut has, at least in this part which is in contact with the first attachment unit, a shape which even allows movement of the fastener in three dimensions during alignment and connection of the first rotor blade segment and the second rotor blade segment. This allows even more flexibility during manufacturing and attachment of the attachment units to the rotor blade segments.

As an example, such a nut may have, at least in this part which is in contact with the first attachment unit, the shape of an ellipsoid. A special case of an ellipsoid is a sphere. These types of joints having a sphere or, more generally, an ellipsoid, and a second object with a corresponding or mating outer surface is in principle well known from machinery or even biology. Such a joint has the advantage of three degrees of freedom which gives a maximum of flexibility regarding the movement of the fastener relative to the attachment unit, in the present case of a rotor blade of a wind turbine.

In another embodiment of the invention, the fastener comprises a fastener head, and a washer which is arranged between the fastener head and the second attachment device.

Note that in the context of this patent application, the washer needs to be interpreted in a broad way. This means that not only disk-shaped washers need to be considered, but also a washer which has a shape of a spherical cylinder such as the nut which is connected with the first attachment unit, however without a thread at the inner surface of this cylinder. Such a cylindrical washer has the advantage that the attachment unit, in this case the second attachment unit, can be designed similarly to the first attachment unit, meaning that it also comprises an outer surface which has a curved shape and which corresponds to the outer surface of a spherical cylinder.

Finally, embodiments of the invention are related to a wind turbine comprising at least one rotor blade according to embodiments of the invention as described above.

BRIEF DESCRIPTION

Some of the embodiments will be described in detail, with reference to the following figures, wherein like designations denote like members, wherein.

DETAILED DESCRIPTION

The illustration in the drawings is in schematic form. It is noted that in different figures, similar or identical elements may be provided with the same reference signs.

Figure 1:
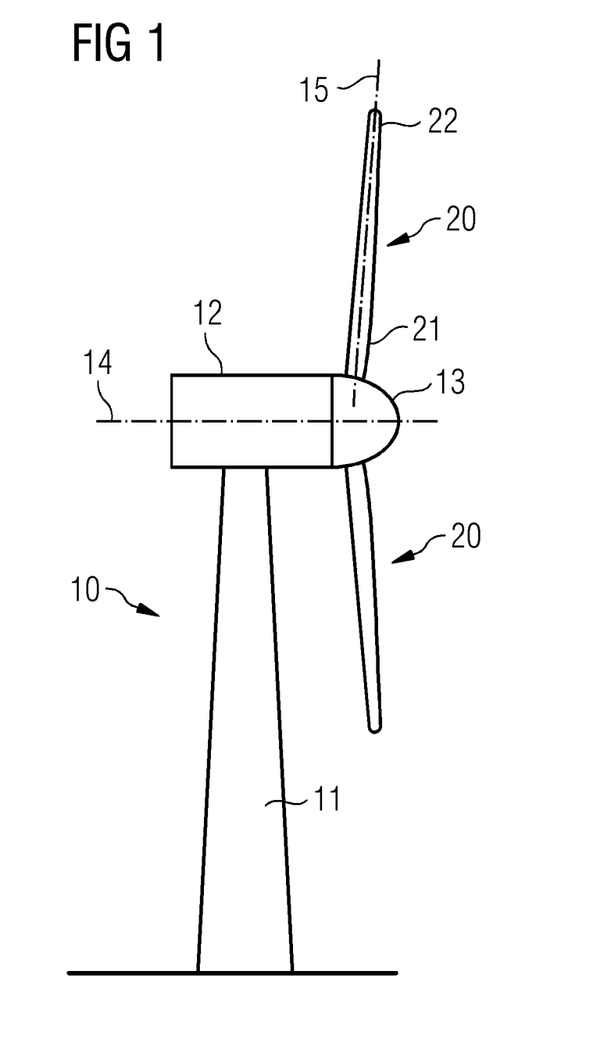
FIG. 1 shows a wind turbine.

FIG. 1 shows a wind turbine 10. The wind turbine comprises a tower 11 and a nacelle 12. The nacelle 12 is mounted rotatably about a yaw axis with regard to the tower 11. The nacelle 12 accommodates the generator and the gear box, if present. The nacelle 12 is connected with a hub 13.

The hub 13 is a part of the rotor of the wind turbine 10. The rotor comprises a rotor axis 14 which is substantially horizontal, but in many cases slightly inclined about a few degrees upwards in order to reduce the risk of collision between the rotor blades 20 of the wind turbine 10 and the tower 11. A set of rotor blades 20 is mounted at the hub 13. In many cases, wind turbines 10 have three rotor blades 20 mounted to the hub 13. Conventionally, the rotor blades 20 are mounted rotatably or pivotably to the hub 13. The axis or rotation of these rotor blades 20 is referred to as the pitch axis 15.

Figure 2:
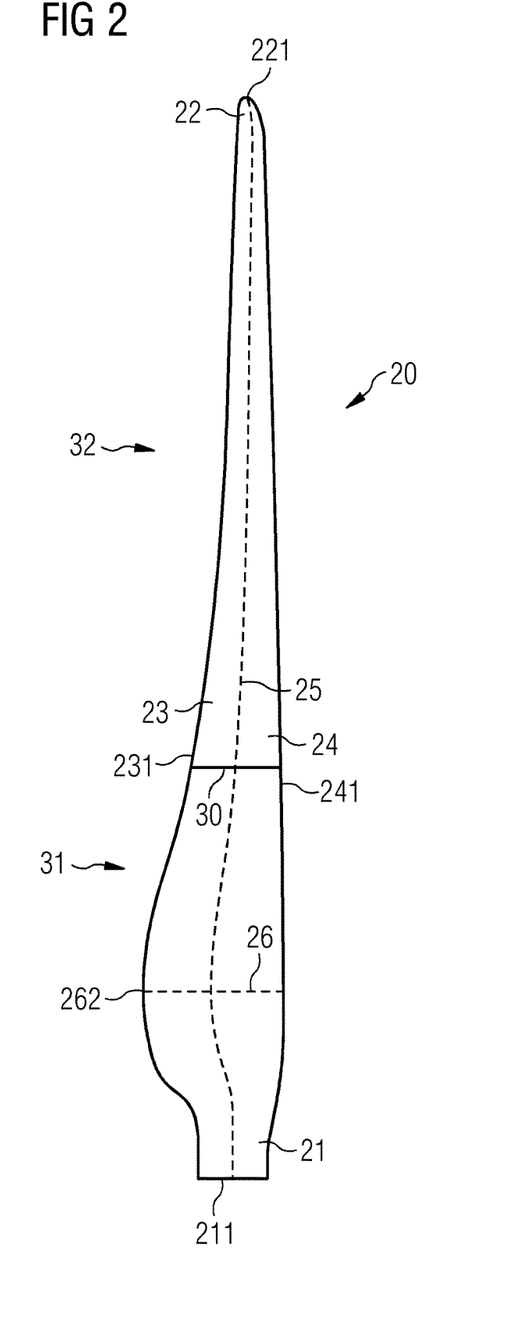
FIG. 2 shows a segmented rotor blade of a wind turbine.

A rotor blade 20 always comprises a root section 21 and a tip section 22. It is mounted to the hub 13 at the root section 21, thus that the tip section 22 is furthermost apart from the hub 13. FIG. 2 shows a schematic top view on a rotor blade 20. The rotor blade 20 comprises a root section 21 with a root 211, and a tip section 22 with a tip 221. The rotor blade 20 furthermore comprises a trailing edge section 23 with a trailing edge 231, and a leading edge section 24 with a leading edge 241. The straight line which connects the leading edge 241 with the trailing edge 231 at each radial position is referred to as the chord 26. The length of the chord 26 is largest at the shoulder 262. The mid-section of the chord 26 is shown by line 25.

The rotor blade 20 of FIG. 2 is divided into a first rotor blade segment 31 and a second rotor blade segment 32. These two rotor blade segments 31, 32 are connected via a joint 30. In the example of FIG. 2, the first rotor blade segment 31 refers to the inner segment, comprising the root section 21, and the second rotor blade segment 32 refers to the outer segment, comprising the tip section 22 of the rotor blade 20.

Figure 3:
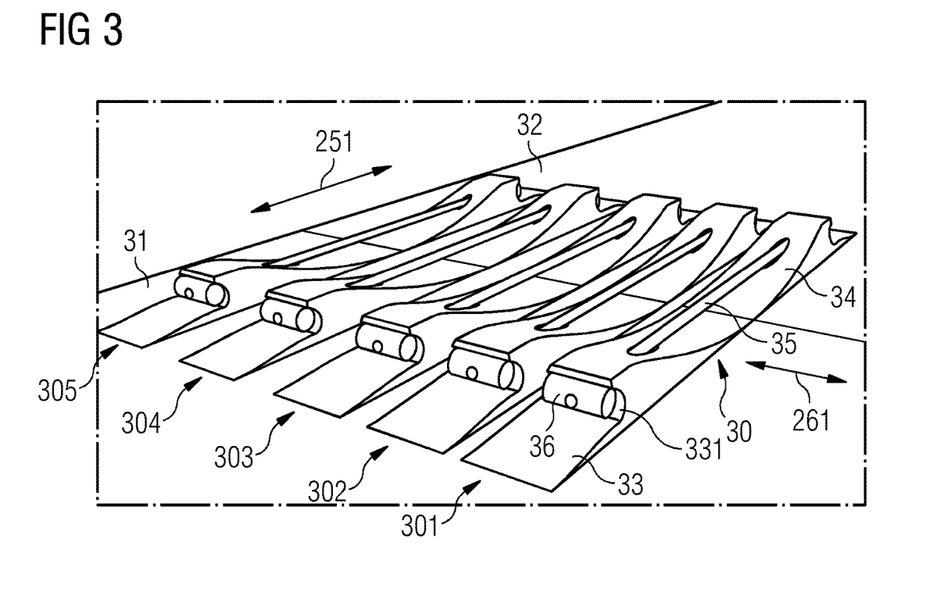
FIG. 3 shows a plurality of bolted joints connecting a first rotor blade segment and a second rotor blade segment.

FIG. 3 shows five joints, namely a first joint 301, a second joint 302, a third joint 303, a fourth joint 304, and a fifth joint 305, which are all designed and arranged according to a first embodiment of a bolted joint 30. It can be seen, that each joint connects a first rotor blade segment 31 with a second rotor blade segment 32.

Referring now to the first joint 301, the joint comprises a first attachment unit 33, a second attachment unit 34 and a fastener 35 which is connecting both attachment units 33, 34. Note that the first attachment unit 33 is attached to the first rotor blade segment 31, while the second attachment unit 34 is connected with the second rotor blade segment 32. The first attachment unit 33 is designed such that it comprises one part which is arranged and prepared to receive and support a nut 36. This nut 36 is shaped as a circular cylinder with a longitudinal axis which is substantially parallel to the chordwise direction 261 of the rotor blade 20 and substantially perpendicular to the spanwise direction 251 of the rotor blade 20. In other words, the longitudinal axis of the nut 36 is substantially perpendicular to the fastener 35. The curvature of the outer surface 361 of the nut 36 corresponds to the curvature of the outer surface 331 of the first attachment unit 33. When connecting both attachment units 33, 34, or in other words when connecting both rotor blade segments 31, 32, the threaded fastener 35 is screwed into the nut 36. This is carried out until the fastener is tightened, which may for example be ensured until the head of the fastener, in other words the fastener head, has close contact with the outer surface of the second attachment unit 34.

The advantage of the cylindrical shape of the nut 36 is that the fastener is able to be orientated within a predetermined range in a direction perpendicular to the spanwise direction 251 and the chordwise direction 261. In other words, in the example of FIG. 3, the fastener 35 may be moved slightly upwards and downwards during alignment and connection of the rotor blade segments 31, 32. This is advantageous, because by this the attachment units 33, 34 do not need to be manufactured highly precisely. The same applies to the attachment of these attachment units 33, 34. Specifically, when a plurality of joints 301 to 305 is present, this tolerance upwards and downwards of the fastener 35 is of great benefit.

Figure 4:
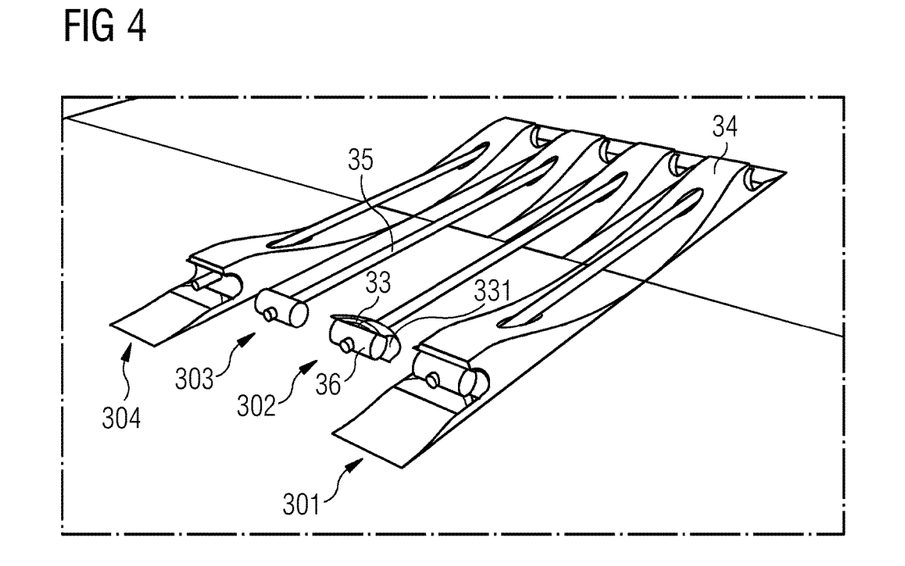
FIG. 4 shows a detailed view of FIG. 3.

FIG. 4 shows another view of four of the joints which have been illustrated in FIG. 3 already. It can be seen that the second joint 302 has a first attachment unit 33 which has an outer surface 331 which is shaped and designed similar to a part of a sphere. This may allow even more degrees of freedom during alignment and connection of the rotor blade segments. Note that for sake of clarity and simplicity, the second, third and fourth joint 302 to 304 are only drawn in parts such that the single components of the joints may be seen more clearly.

Figure 5:
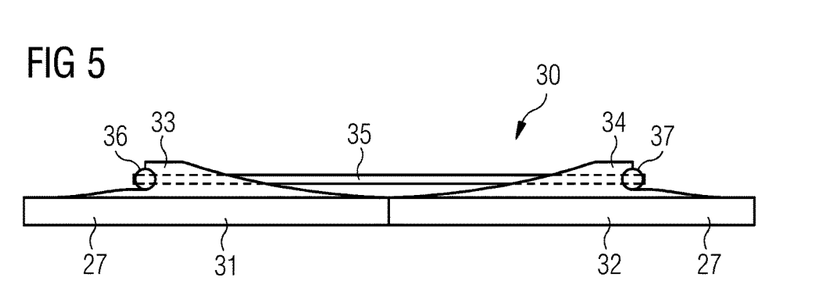
FIG. 5 shows a cross-sectional view of a bolted joint as depicted in FIGS. 3 and 4.

FIG. 5 shows a cross-sectional view of a bolted joint 30. It can be seen that in this embodiment, the first attachment unit 33 and the second attachment unit 34 are configured similarly and are arranged symmetrically. However, note that in this example the element 36 which is in close contact to the first attachment unit 33 represent a nut with a threaded insert while the element 37 represents a washer which is in close contact to the second attachment unit 34 and which does not have a threaded insert. By this the threaded fastener 35 can be tightened reliably and firmly such that both rotor blade segments 31, 32 are tightened together reliably. Also note that in FIG. 5 the rotor blade shells 27 can be well discerned. Note that in principal the attachment units 33, 34 may be placed either at the inner surface or the outer surface of the blade shells 27. For aerodynamic and other reasons it is highly advantageous to place the bolted joints 30 at the inner surface, i.e. in the hollow space inside the rotor blade instead of outside.

Figure 6:
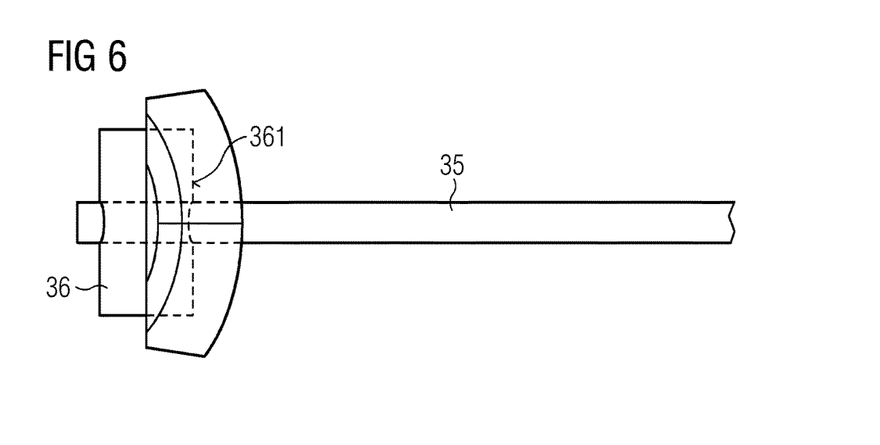
FIG. 6 shows an embodiment of a bolted joint enabling two degrees of freedom during alignment and connection of the rotor blade segment.

FIG. 6 shows in detail a portion of the attachment unit which has a spherical outer surface. This allows for improved alignment and connection possibilities as three degrees of freedom are provided, namely in the plane and out of the plane.

Figure 7:
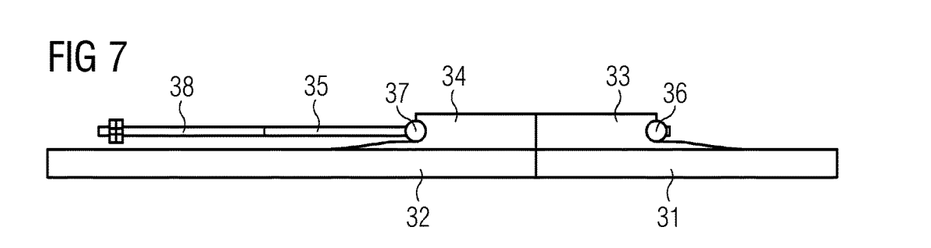
FIG. 7 shows another embodiment of a bolted joint comprising a reinforced first and second attachment unit and an extender.

FIG. 7 shows another embodiment of the inventive bolted joint. In this embodiment, the first attachment unit 33 and the second attachment unit 34 are both designed in a reinforced manner and have a certain filler material in between. In other words, the attachment units 33, 34 do not only provide a reception and support of the nut or the washer but also provide for increased stiffness and do have an "extended contact area" when the two rotor blade segments 31, 32 are firmly connected with each other. This extended contact area has the technical effect that a tilting movement of the first rotor blade segment 31 relative to the second rotor blade segment 32 about a tilting axis being parallel to the joint 30 is counteracted.

Another feature of the embodiment as illustrated in FIG. 7 is the extender 38 which extends the threaded fastener 35 to the side of the second attachment unit 34. In particular, the extender 38 comprises an outer cylinder which surrounds the corresponding part of the threaded fastener 35. The outer extender is fixed by a fixing element, e.g. a nut, as shown at the left side of the extender 38 in FIG. 7. The presence of the extender mitigates forces acting on the joint 30 during operation of the wind turbine.

Figure 8:
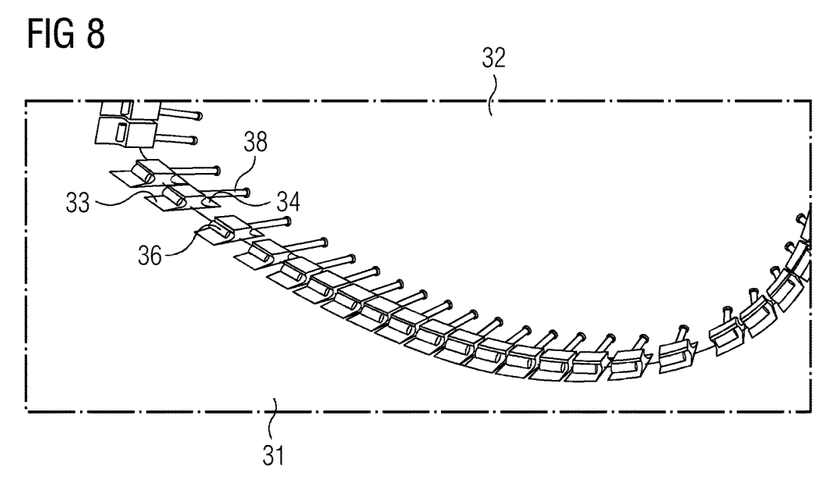
FIG. 8 shows a plurality of bolted joints according to the embodiment as illustrated in FIG. 7.

Finally, FIG. 8 shows the joint as illustrated in FIG. 7 applied to two rotor blade segments 31, 32. It can be seen that in large rotor blades, a plurality, namely a number of at least twenty-five bolted joints are necessary and beneficial for connecting the rotor blade segments 31, 32 together.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A rotor blade of a wind turbine, wherein
the rotor blade comprises a first rotor blade segment and a second rotor blade segment,
the first rotor blade segment is connected with the second rotor blade segment by at least one bolted joint,
the bolted joint comprises a first attachment unit, which is attached to the first rotor blade segment and which comprises a first attachment unit tapered surface, and a second attachment unit, which is attached to the second rotor blade segment and which comprises a second attachment unit tapered surface, and
the bolted joint comprises a threaded fastener which connects the first attachment unit with the second attachment unit such that together they form a concave surface, wherein
the threaded fastener is tightened using a nut,
the nut is in contact with the first attachment unit,
the nut has at least partially a curved outer surface,
the first attachment unit has at least partially a curved outer surface as well, and
the outer surface of the nut and the outer surface of the first attachment unit correspond to each other.

2. The rotor blade according to claim 1, wherein the nut has, at least in the part which is in contact with the first attachment unit, a shape which allows movement of the fastener in two dimensions during alignment and connection of the first rotor blade segment and the second rotor blade segment.

3. The rotor blade according to claim 1, wherein the nut has, at least in the part which is in contact with the first attachment unit, a shape which allows movement of the fastener in three dimensions during alignment and connection of the first rotor blade segment and the second rotor blade segment.

4. The rotor blade according to claim 1, wherein the nut has, at least in the part which is in contact with the first attachment unit, the shape of an ellipsoid.

5. The rotor blade according to claim 1, wherein
the fastener comprises a fastener head, and
a washer is arranged between the fastener head and the second attachment unit.

6. The rotor blade according to claim 5, wherein
the washer has at least partially a curved outer surface,
the second attachment unit has at least partially a curved outer surface as well, and
the outer surface of the washer and the outer surface of the second attachment unit correspond to each other.

7. A wind turbine comprising at least one rotor blade according to claim 1.

8. The rotor blade according to claim 1, wherein the first attachment unit is cast to the first rotor blade segment.

9. The rotor blade according to claim 1, wherein the first attachment unit is attached to the first rotor blade segment by an adhesive bond.

10. The rotor blade according to claim 1, wherein the first rotor blade segment is connected with the second rotor blade segment by a plurality of bolted joints including at least ten bolted joints.

11. The rotor blade according to claim 1, wherein
the first rotor blade segment is a radially inward portion of the rotor blade, comprising the root of the rotor blade, and
the second rotor blade segment is a radially outward portion of the rotor blade, comprising the tip of the rotor blade.

12. The rotor blade according to claim 1, wherein at least the first attachment unit comprises a through-hole for receiving and supporting the threaded fastener.

13. The rotor blade of claim 1 wherein the nut has, at least in the part which is in contact with the first attachment unit, the shape of a circular cylinder with a longitudinal axis which is substantially perpendicular to the longitudinal axis of the rotor blade.

* * * * *